United States Patent Office 3,787,554
Patented Jan. 22, 1974

3,787,554
PROCESS FOR THE SEPARATION OF
IRIDIUM AND RHODIUM
Max Ziegler, Gottingen-Herberhausen, Germany, assignor
to W. C. Heraeus GmbH, Hanau, Germany
No Drawing. Filed Aug. 2, 1972, Ser. No. 277,209
Claims priority, application Germany, Sept. 3, 1971,
P 21 44 151.0
Int. Cl. C01g 55/00
U.S. Cl. 423—22                                  9 Claims

ABSTRACT OF THE DISCLOSURE

Iridium is separated from aqueous mineral acid solutions containing iridium and rhodium using an organically substituted ammonium salt and extracting the iridium complex that is formed with an organic solvent. Trialkyl ammonium halides are used to form the iridium complex and aliphatic or aromatic halogenated hydrocarbon, a carboxylic acid ester or a slightly water-soluble alcohol are used to extract the iridium complex.

BACKGROUND

This invention relates to a process for the separation of iridium from aqueous mineral acid solutions containing iridium and rhodium, using an organically substtuted ammonium salt and extracting with an organic solvent the iridium complex compound that has formed.

It is in the prior art to use ion exchangers for the separation of iridium and rhodium present together in aqueous solution. For example, the use of the anion exchange resin Amberlite IRA–400 for solutions containing iridium and rhodium in the form of their chlorides is described in Analytical Chemistry 30 (1958), No. 9, pp. 1464 to 1466. In this process the addition of Cer(IV) is necessary, as a result of the reducing action of the resin, in order to keep the iridium in the tetravalent state. Furthermore, the iridium is more or less strongly bound to the individual resin particles, so that it can be separated from the resin only by an expensive extraction process. The use of ion exchange resins for the separation of iridium and rhodium has not been accepted in the art.

Iridium and rhodium may also be separated by extraction. For example, after forming complex compounds with tin(II) chloride, rhodium may be selectively extracted with isopentyl alcohol (Analytical Chemistry 34 (1962), No. 6, pp. 623 to 625). This method of separation, however, is not applicable when the rhodium is present in a great excess.

The extraction of iridium(IV) from a hydrochloric acid solution containing rhodium(III) through the use of tributyl phosphate, as described in Analytical Chemistry 33 (1961), No. 12, pp. 1650 to 1652, serves especially for the determination of rhodium and, as it appears from Talanta 14 (1967), p. 1002, at the beginning of the paragraph entitled "Rhodium und Iridium," it is limited in its application.

From the publication Zhurnal Analithicheskoi Khimii 20 (1965), No. 2, pp. 192 to 195, it is in the prior art to add tri-isobutylamine hydrochloride to aqueous solutions containing iridium(III) in the form of hexachloroiridate(III), $[IrCl_6]^{3-}$, and rhodium(III) in the form of hexachlororhodate(III), $[RhCl_6]^{3-}$, and to separate the iridium complex compound that has formed by using chloroform. The distribution coefficient for iridium attains a maximum of 1.72 in this separation method. Even an approximately quantitative separation of the iridium from the solution containing iridium(III) and rhodium-(III) is either utterly impossible or extremely expensive, even when very large volumes of chloroform and a great amount of tri-isobutylamine hydrochloride are used, since a plurality of extractions are required for the purpose.

SUMMARY

This invention is a process for the separation of iridium from aqueous solutions containing iridium and rhodium, even in the presence of large quantitative of rhodium.

It has surprisingly been found that this problem is solved in accordance with the invention by adding a tri-n- or tri-iso-alkylammonium halide to an aqueous solution containing iridium(IV) and rhodium(III) and extracting the iridium(IV) complex compound that has formed with an aliphatic or aromatic halogenated hydrocarbon, a carboxylic acid ester or an alcohol that is slightly soluble in water. The iridium may be recovered from the extract by reduction with $SO_2$ in the presence of iron(III) chloride to iridium(III), combined with simultaneous re-extraction with an aqueous solution of hydrochloric acid, and may be won therefrom by known methods, e.g., by cementation.

DESCRIPTION

Tri-n-alkylammonium halides, such as tri-n-butyl-, tri-n-amyl- and tri-n-propylammonium halides have proven to be especially good complex-forming reagents; tri-n-butylammonium chloride is used preferentially. Suitable extracting agents are especially chloroform, methylene chloride, 1,1,2 - trichloroethane, 1,2,3 - trichloropropane, chlorobenzene, 1,2-dichlorobenzene, or the analogous bromine compounds. Ethyl acetate, isoamyl acetate, amyl alcohol or octanol have also proven to be suitable extracting agents.

It is advantageous to use hydrochloric acid solutions as the mineral acid solutions.

Experiments have shown that, with the process of the invention, distribution coefficients for iridium of more than 150 are attained, and in some cases of even more than 400. These distribution coefficients are two powers of ten higher than those known in the state of the art, which proves that the process of the invention has a great separating sensitivity.

It has furthermore been found that the separation of iridium from the aqueous mineral acid solution is independent, within wide limits, of the acid content of the solution.

By the method of the invention, iridium and rhodium can be separated from one another in a virtually quantitative manner, which has also been confirmed by absorption spectra. The specificity of the separating process of the invention is in a ratio of 1:about 10,000 for iridium: rhodium.

Another advantage of the process of the invention is that, for the formation of the iridium(IV) complex compound, reagents are preferentially used which are considerably less expensive than the previously used tri-isobutylamine hydrochloride, so that the separating process of the invention can be performed at less expense.

A preferred method of performing the process of the invention will be illustrated by means of an example in which very small amounts of iridium can be separated from 6000-fold excesses of rhodium in order to illustrate its efficiency. In precisely the same manner, however, great excesses of iridium are also separable from small amounts of rhodium, as for example when the ratio of rhodium to iridium is 1:6000.

A solution of 100 micrograms of iridium(IV) in the form of $H_2IrCl_6$, and 0.6 g. of rhodium(III) in the form of $RHCl_3.xH_2O$, in 50 ml. of water with about 3% by volume of concentrated hydrochloric acid, is mixed in the separatory funnel with 2 ml. of tri-n-butylammonium chloride solution (40% solution) and extracted twice with 10 ml. of methylene chloride. The non-aqueous phases are passed through a filter-flake stopper filter into a 25 ml. measuring flask.

The filter flakes are washed with methylene chloride which is then used in order to bring the volume of the non-aqueous phase up to 25 ml. The photometric determination of the iridium(IV) is performed at 495 nm. The stability of the $[IrCl_6]^{2-}$ in the non-aqueous phase is sufficiently great for the achievement of a complete extraction of the iridium, which would have been interfered with if iridium(III) had been present.

The iridium that is put in is recovered in the non-aqueous phase with an accuracy of plus or minus 0.5%. The rhodium remains quantitatively in the aqueous phase.

Usually, the starting material being separated contains iridium in the form of iridium(III). For the oxidation of the iridium it is therefore treated with chlorine or hydrogen peroxide, in a known manner.

The process of the invention may be used advantageously also for aqueous mineral acid solutions containing nickel and/or cobalt in addition to iridium and rhodium. In this case it is preferred to add up to 10% by volume of nitric acid or nitrous acid to the hydrochloric acid solution. Quantitative extractions of iridium are achieved from solutions containing cobalt in addition to iridium and rhodium, up to an iridium-to-cobalt ratio of the order of 1:4000.

What is claimed is:

1. Process for separating iridium from aqueous mineral acid solutions containing iridium and rhodium, using an organically substituted ammonium salt and extracting the iridium complex compound that is formed with an organic solvent which comprises adding a tri-n- or tri-isoalkyl ammonium halide to an aqueous solution containing iridium(IV) and rhodium(III) and extracting the iridium(IV) complex compound formed with an aliphatic or aromatic halogenated hydrocarbon, a carboxylic acid ester, or a slightly water-soluble alcohol.

2. Process of claim 1 wherein tri-n-butylammonium halide, tri-n-amylammonium halide or tri-n-propylammonium halide is added to the mineral acid aqueous solution.

3. Process of claim 1 wherein tri-n-butylammonium chloride is added to the mineral acid aqueous solution.

4. Process of claim 1 wherein the extraction is carried out with chloroform, methylene chloride, 1,1,2-trichloroethane, 1,2,3-trichloropropane, chlorobenzene, 1,2-dichlorobenzene, or the analogous bromine compounds.

5. Process of claim 1 wherein the extraction is carried out with ethyl acetate or isoamyl acetate.

6. Process of claim 1 wherein the extraction is carried out with amyl alcohol or octanol.

7. Process of claim 3 wherein hydrochloric acid solutions are used as the mineral acid solutions.

8. Process of claim 1 wherein the aqueous solution contains in addition nickel and/or cobalt.

9. Process of claim 1 wherein up to 10 percent by volume of nitric acid or nitrous acid is added to the mineral acid solution.

References Cited

Borbat et al.: "Chemical Abstracts," vol. 65, 1966, p. 11423(c).

Breamish, "Talanta," vol. 5, 1960, pp. 1–35.

Marks et al.: "Analytical Chemistry," vol. 30, 1958, p. 1464.

Tertipis et al.: "Analytical Chemistry," vol. 34, 1962, pp. 623.

Wilson et al.: "Analytical Chemistry," vol. 33, 1961, pp. 1650–1652.

HERBERT T. CARTER, Primary Examiner

U.S. Cl. X.R.

75—101 BE